`US007102565B2`

United States Patent
Jesson

(10) Patent No.: US 7,102,565 B2
(45) Date of Patent: Sep. 5, 2006

(54) POWER SAVING OPERATION IN A GPS-BASED ASSET TRACKING UNIT

(75) Inventor: Joseph E. Jesson, Hamilton Square, NJ (US)

(73) Assignee: Transport International Pool, Inc., Devon, PA (US)

( * ) Notice: Subject to any disclaimer, the term of this patent is extended or adjusted under 35 U.S.C. 154(b) by 161 days.

(21) Appl. No.: 10/830,520

(22) Filed: Apr. 23, 2004

(65) Prior Publication Data

US 2005/0200520 A1    Sep. 15, 2005

Related U.S. Application Data

(60) Provisional application No. 60/552,494, filed on Mar. 12, 2004.

(51) Int. Cl.
*G01S 1/00* (2006.01)
*H04B 7/185* (2006.01)

(52) U.S. Cl. ........................... 342/357.12
(58) Field of Classification Search .......... 342/357.06, 342/357.12, 357.13; 701/207, 213, 215
See application file for complete search history.

(56) References Cited

U.S. PATENT DOCUMENTS

| | | | |
|---|---|---|---|
| 5,883,594 | A | 3/1999 | Lau |
| 6,104,978 | A | 8/2000 | Harrison et al. |
| 6,212,133 | B1 | 4/2001 | McCoy et al. |
| 6,392,593 | B1 | 5/2002 | Pemble |
| 6,642,886 | B1 | 11/2003 | King |
| 6,662,107 | B1 * | 12/2003 | Gronemeyer ............... 701/213 |
| 6,778,135 | B1 * | 8/2004 | Warloe et al. ......... 342/357.12 |
| 2004/0095272 | A1 * | 5/2004 | Warloe et al. ......... 342/357.06 |

* cited by examiner

*Primary Examiner*—Dao L. Phan
(74) *Attorney, Agent, or Firm*—Buckley, Maschoff & Talwalkar LLC

(57) ABSTRACT

A GPS receiver is activated and it is determined whether the GPS receiver has received within a first predetermined attempt period of time a set of GPS signals that is adequate to determine a location of the GPS receiver. If not, the GPS receiver is deactivated for a first delay period of time. The GPS receiver is then activated again and it is determined whether the GPS receiver has received a complete set of GPS signals within a second predetermined attempt period. If not, the GPS receiver is deactivated for a second delay period of time that is longer than the first delay period of time. The GPS receiver is then activated once more and again attempts to acquire a complete set of GPS signals.

19 Claims, 4 Drawing Sheets

POWER SAVING OPERATION IN A GPS-BASED ASSET TRACKING UNIT

CROSS-REFERENCE TO RELATED APPLICATION

This application claims the benefit of U.S. Provisional Application Ser. No. 60/552,494 filed on Mar. 12, 2004, which is incorporated herein by reference.

FIELD

The present invention relates to operations of GPS (Global Positioning System) receivers used in asset tracking applications, and is more particularly concerned with methods of operating such GPS receivers so as to conserve battery life and allow a GPS position fix through an intermittent, localized interfering signal.

BACKGROUND

Extensive systems have been deployed to use GPS capabilities for the purpose of tracking vehicle fleets of, e.g., truck trailers, truck tractors and/or trucks; or railcars. Such systems have been referred to as "asset tracking systems" and deploy asset tracking units designed to be attached to individual vehicles. Each asset tracking unit includes a GPS receiver that is capable of receiving GPS signals from a plurality of GPS satellites and determining the unit's location based on the GPS signals. Typically simultaneous or nearly simultaneous receipt of signals from at least three GPS satellites (to provide a 2D fix without altitude) or four GPS satellites (to provide a 3D fix with altitude) is required to fix the unit's location. When a fix is obtained, the asset tracking unit may report the unit's location via satellite communication (using another set of satellites) or the like to a central station. With such a system, the proprietor of the vehicle fleet will have information concerning the whereabouts of all vehicles in the fleet. This may lead to significant efficiencies in planning and managing assignments of vehicles to particular tasks. In addition, an asset tracking system of this type may help in the detection of, and response to, irregularities such as theft of vehicles.

Asset tracking units may operate on battery power, and may be required to operate in the field for extensive periods of time without recharging or replacement of batteries. Accordingly, power management may be a critical issue for satisfactory deployment and use of GPS-based asset tracking units. The activity of the GPS receiver component of the asset tracking unit may represent a significant portion of the power drain on the unit battery. It is therefore highly desirable that an asset tracking unit be operated in a manner that maximizes the likelihood of successful acquisition of the requisite number of GPS satellite signals, while minimizing power consumption.

SUMMARY

To alleviate problems inherent in the prior art, the present invention introduces improved asset tracking units and methods for operating the same.

According to one embodiment, an asset tracking unit includes a GPS receiver configured to selectively receive GPS signals from GPS satellites and a controller that is coupled to the GPS receiver. The controller may be programmed to (i) activate the GPS receiver in response to a predetermined occurrence, (ii) determine whether the GPS receiver has received within a first predetermined attempt period of time a set of GPS signals adequate to determine a location of the asset tracking unit; (iii) if the controller determines that the GPS receiver did not receive the set of the GPS signals within the first predetermined attempt period of time, deactivate the GPS receiver for a first delay period of time, (iv) activate the GPS receiver upon completion of the first delay period of time, (v) determine whether the GPS receiver has received within a second predetermined attempt period of time, immediately following the first delay period of time, a set of GPS signals adequate to determine the location of the asset tracking unit, (vi) if the controller determines that the GPS receiver did not receive the set of GPS signals within the second predetermined attempt period of time, deactivate the GPS receiver for a second delay period of time that is longer than the first delay period of time, and (vii) activate the GPS receiver upon completion of the second delay period of time.

According to another embodiment, a method of operating a GPS receiver includes (1) activating the GPS receiver in response to a predetermined occurrence, (2) determining whether the GPS receiver has received within a first predetermined attempt period of time a set of GPS signals adequate to determine a location of the GPS receiver, (3) if it is determined that the GPS receiver did not receive the set of the GPS signals within the first predetermined attempt period of time, deactivating the GPS receiver for a first delay period of time, (4) activating the GPS receiver upon completion of the first delay period of time, (5) determining whether the GPS receiver has received within a second predetermined attempt period of time, immediately following the first delay period of time, a set of GPS signals adequate to determine the location of the GPS receiver, (6) if it is determined that the GPS receiver did not receive the set of GPS signals within the second predetermined attempt period of time, deactivating the GPS receiver for a second delay period of time that is longer than the first delay period of time, and (7) activating the GPS receiver upon completion of the second delay period of time.

According to still another embodiment, a method of operating a GPS receiver includes (a) attempting to acquire a complete set of GPS signals, (b) determining that the attempt in (a) has failed, (c) in response to the determination at (b), entering an idle state for a first predetermined period, (d) emerging from the idle state at the end of the first predetermined period and again attempting to acquire a complete set of GPS signals, (e) determining that the attempt in (d) has failed, (f) in response to the determination at (e), entering an idle state for a second predetermined period that is longer than the first predetermined period, (g) emerging from the idle state at the end of the second predetermined period and again attempting to acquire a complete set of GPS signals, (h) determining that the attempt in (g) has failed, (i) in response to the determination at (h), entering an idle state for a third predetermined period that is longer than the second predetermined period, and (i) emerging from the idle state at the end of the third predetermined period and again attempting to acquire a complete set of GPS signals.

As used herein and in the appended claims:

"transportation vehicle" includes a truck, a truck trailer, a truck tractor, a railcar and a locomotive;

"occurrence" includes the occurrence of a predetermined point in time or occurrence of an event detectable by a sensor or the like;

"controller" refers to any suitably programmable data processing device which may control an electronic device, and specifically includes a microprocessor, a microcontroller and a digital signal processor or any combination of one or more of such devices;

"complete set of GPS signals" refers to a set of signals from GPS satellites such that the set of signals is adequate to obtain a position fix; and "idle state" refers to a condition in which a GPS receiver is powered down and/or is not attempting to receive and/or process GPS satellite signals.

By progressively increasing the delay period before re-attempting to acquire GPS signals after an unsuccessful attempt, the power drained from the battery of an asset tracking unit can be minimized, while still providing adequate opportunities to successfully acquire GPS signals to obtain a position fix for the asset tracking unit.

With these and other advantages and features of the invention that will become hereinafter apparent, the invention may be more clearly understood by reference to the following detailed description of the invention, the appended claims, and the drawings attached herein.

DETAILED DESCRIPTION

System Overview

Figure 1:
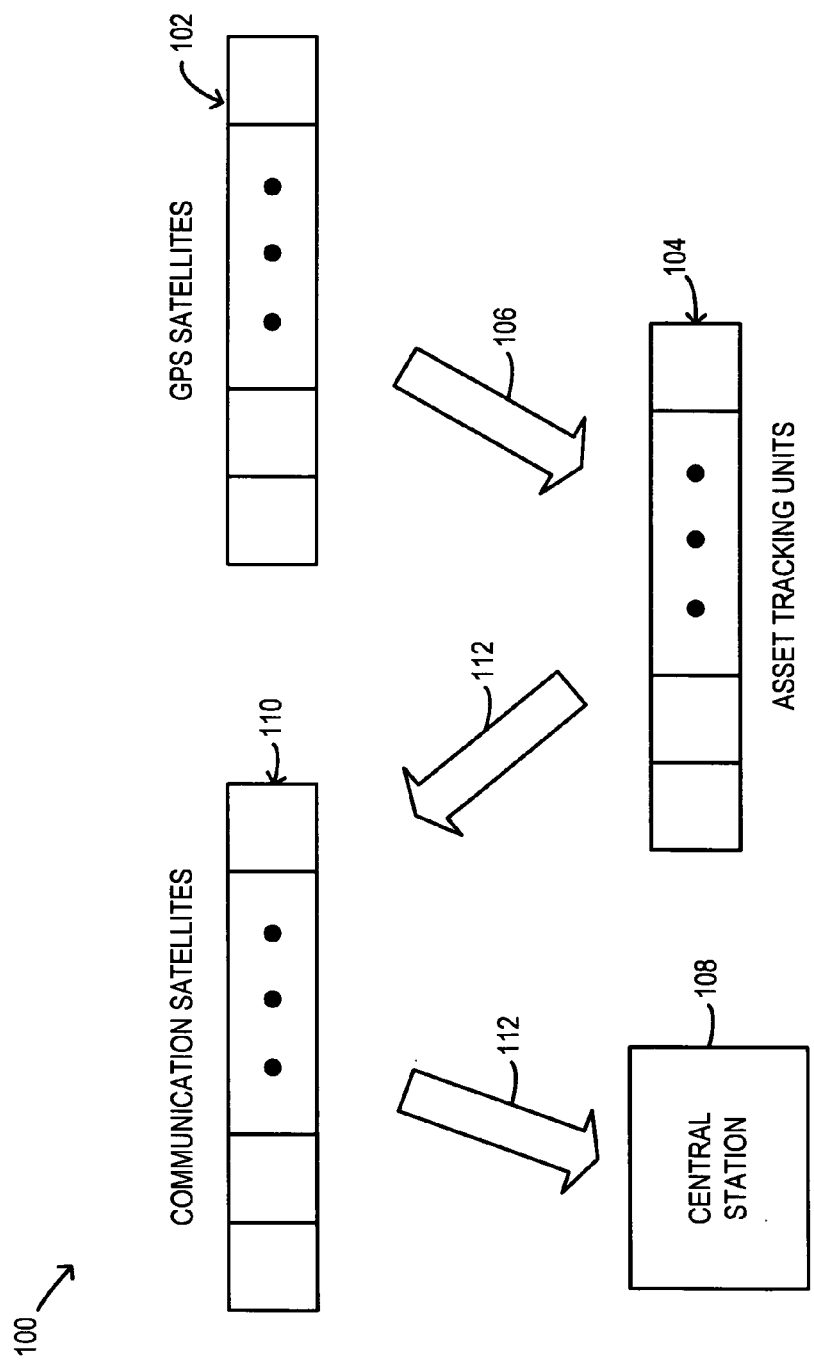
FIG. 1 is a schematic illustration of an asset tracking system according to some embodiments.

Turning now in detail to the drawings, FIG. 1 is a schematic illustration of an asset tracking system provided according to some embodiments of the present invention. In FIG. 1, reference numeral 100 generally indicates the asset tracking system. The asset tracking system 100 makes use of GPS satellites 102, which may be the constellation of 24 satellites provided by the U.S. government for military and civilian position determination applications. A brief description of the U.S. government-provided GPS satellites and typical operations utilizing the satellites is contained in U.S. Pat. No. 6,104,978, which is incorporated herein by reference. Use of the GPS satellites 102 may be shared with other asset tracking systems and/or with other applications which require position determinations.

The asset tracking system 100 includes a plurality of asset tracking units 104, which will be described in more detail below. Each asset tracking unit 104 (other than spares or unassigned units) may be attached to a respective transportation vehicle (e.g., a truck trailer or railcar, not separately shown) which is free to travel over a wide geographical area. Thus the asset tracking units 104 may be widely dispersed. The number of asset tracking units 104 may be at least as large as the number of transportation vehicles in the fleet to be managed using the asset tracking system 100. For example, the number of asset tracking units 104 in the asset tracking system 100 may be in the thousands, tens of thousands or even hundreds of thousands.

At various times and/or on various occasions, the asset tracking units 104 receive the signals (represented at 106) broadcast by the GPS satellites 102 and use the received GPS signals to make determinations of the respective positions of the asset tracking units 104.

The asset tracking system 100 also includes a central station 108 (also sometimes referred to as a "gateway") which monitors the locations of the transportation vehicles to which the asset tracking units 104 are attached. The asset tracking units 104 send to the central station 108 messages which indicate current locations of the asset tracking units 104. For example, messaging from the asset tracking units 104 may utilize a satellite communication system which comprises communication satellites 110. The communication satellites 110 may be shared with other users in addition to the asset tracking system 100. The communication paths from the asset tracking units 104 to the central station 108 via the communication satellites 110 are schematically represented by arrows 112. In some embodiments, two-way communication between the central station 108 and the asset tracking units 104 may be supported. In some embodiments, another communication system (e.g., a cellular telephone network) may be used for communication between the asset tracking units 104 and the central station 108 in addition to or instead of the satellite communication system shown in FIG. 1. In some embodiments, more than one central station may receive communications from the asset tracking units 104.

In some embodiments, all of the hardware aspects of the asset tracking system 100 may be conventional, and functionality in accordance with the present invention may be provided by suitable programming of the asset tracking units 104.

In some embodiments, some or all of the asset tracking units 104 may transmit to the central station 108 raw or partially processed data derived by the asset tracking units from GPS satellite signals received by the asset tracking units, and the central station may calculate position fixes for the asset tracking units from such data, instead of the asset tracking units calculating position fixes for themselves and transmitting reports of their locations to the central station.

Typical Asset Tracking Unit

Figure 2:
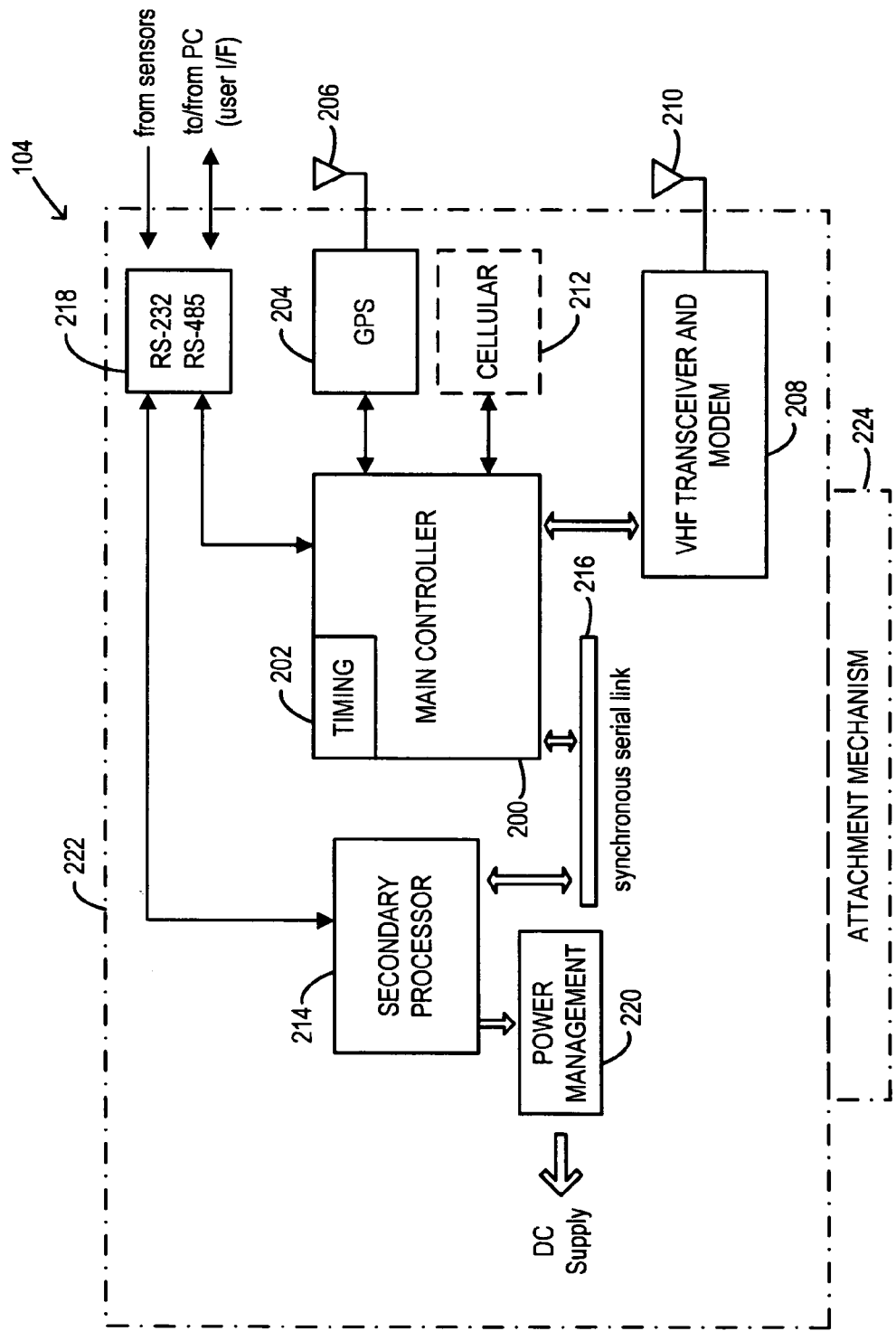
FIG. 2 is a block diagram of a typical one of the asset tracking units that may be included in the asset tracking system of FIG. 1.

FIG. 2 is a block diagram representation of a typical one of the asset tracking units 104.

The asset tracking unit 104 illustrated in FIG. 2 includes a main controller 200, which may, for example, comprise a digital signal processor and a microprocessor, which are not separately shown. As indicated at 202, the main controller may include a capability for timing and/or defining periods of time during which operations of the asset tracking unit 104 may be performed or during which the asset tracking unit 104 may refrain from performing certain operations. The main controller 200 may be embodied as a main circuit board assembly (not separately shown) of the asset tracking unit and may include program and working memory, which also are not separately shown.

The asset tracking unit 104 also includes a GPS receiver 204 which is coupled to the main controller 202. The GPS receiver 204 may be configured in a conventional fashion to receive GPS satellite signals via an antenna 206 and to provide position information to the main controller 202. The position information may reflect a position fix for the asset tracking unit 104 determined by the GPS receiver 204. In some embodiments, the GPS receiver 204 may be constituted as a daughter board (not separately shown) mounted on the main circuit board (not separately shown) which embodies the main controller 200.

The asset tracking unit 104 may further include a VHF transceiver (transmitter-receiver) and modem combination 208, which is coupled to the main controller 200. The VHF transceiver and modem 208 may operate in a conventional fashion under the control of the main controller 200 to send messages from the asset tracking unit 104 to the central station 108 (FIG. 1) via an antenna 210. The VHF transceiver and modem may also operate to receive messages for the asset tracking unit 104 from the central station 108.

In some embodiments, the asset tracking unit 104 may include, in addition to or instead of the VHF transceiver and modem 208, a module 212 (shown in phantom) by which the asset tracking unit 104 is able to communicate with the central station 108 via a cellular telephone communication network. The cellular communication module 212 may be coupled to the main controller 200.

In some embodiments, the asset tracking unit 104 may further include a secondary processor 214 (e.g. another microprocessor) that is coupled to the main controller 200 via a synchronous serial data link 216. The secondary processor 214 may execute one or more applications to implement rules by which the asset tracking unit may operate, and may, for example, be at least partially programmable remotely via messages from the central station 108 or from data messages provided via external data interfaces discussed below. Program and/or working memory for the secondary processor 214 may also be present but are not separately shown.

There may also be included in the asset tracking unit 104 one or more data communication interfaces 218 (e.g., one or more RS-232 and/or RS-485 data communication interfaces) coupled to the main controller 200 and/or to the secondary processor 214. The main controller 200 and/or the secondary processor 214 may receive, via the data communication interfaces 218, input signals from one or more sensors (not shown) installed in association with a transportation vehicle (not shown) to which the asset tracking unit 104 is attached. The input signals from the sensors may inform the asset tracking unit 104 of conditions or changes in condition relative to the transportation vehicle. For example, the sensors may provide signals to the asset tracking unit 104 via the interfaces 218 to indicate whether a door or doors of the transportation vehicle are open or closed; whether, in the case where the transportation vehicle is a truck trailer, the transportation vehicle is connected to or disconnected from a truck trailer; and/or whether a cargo is present in the transportation vehicle.

One or more communication interface 218 may also provide part of a data communication path between the asset tracking unit 104 and an external data processing device (not shown), such as a personal computer that a user may operate to communicate with the asset tracking unit 104.

The asset tracking unit 104 may also include a power management module 220 coupled to the secondary processor 214 and operable to optimize consumption of power by the asset tracking unit 104. For that purpose the power management module 220 may interoperate with a power supply (not shown) for the asset tracking unit, which may include one or more batteries (not shown).

Further, the asset tracking unit 104 may include a housing 222 (indicated with a dash-dot line) which supports and/or contains all the other components of the asset tracking unit 104. In addition, the asset tracking unit 104 may include a conventional mechanism 224 (also indicated with a dash-dot line) by which the housing 222 may be secured to a transportation vehicle.

The main controller 200 may be programmed with one or more software programs that control operation of the main controller 200. Such programs may include, for example, a so-called "kernel" which provides low-level control operations, operating system functions (as in a "PSOS" operating system) and device drivers. The software which controls the main controller 200 may also include capabilities for sending and/or receiving electronic mail messages via the VHF transceiver and modem 208 to and/or from the gateway 108 (FIG. 1). Other functions, such as power management (e.g., selectively shutting down and re-activating components of the asset tracking unit 104, initiating and concluding sleep modes, etc.), may also be performed under the control of software that programs the main controller 200.

Figure 3A:
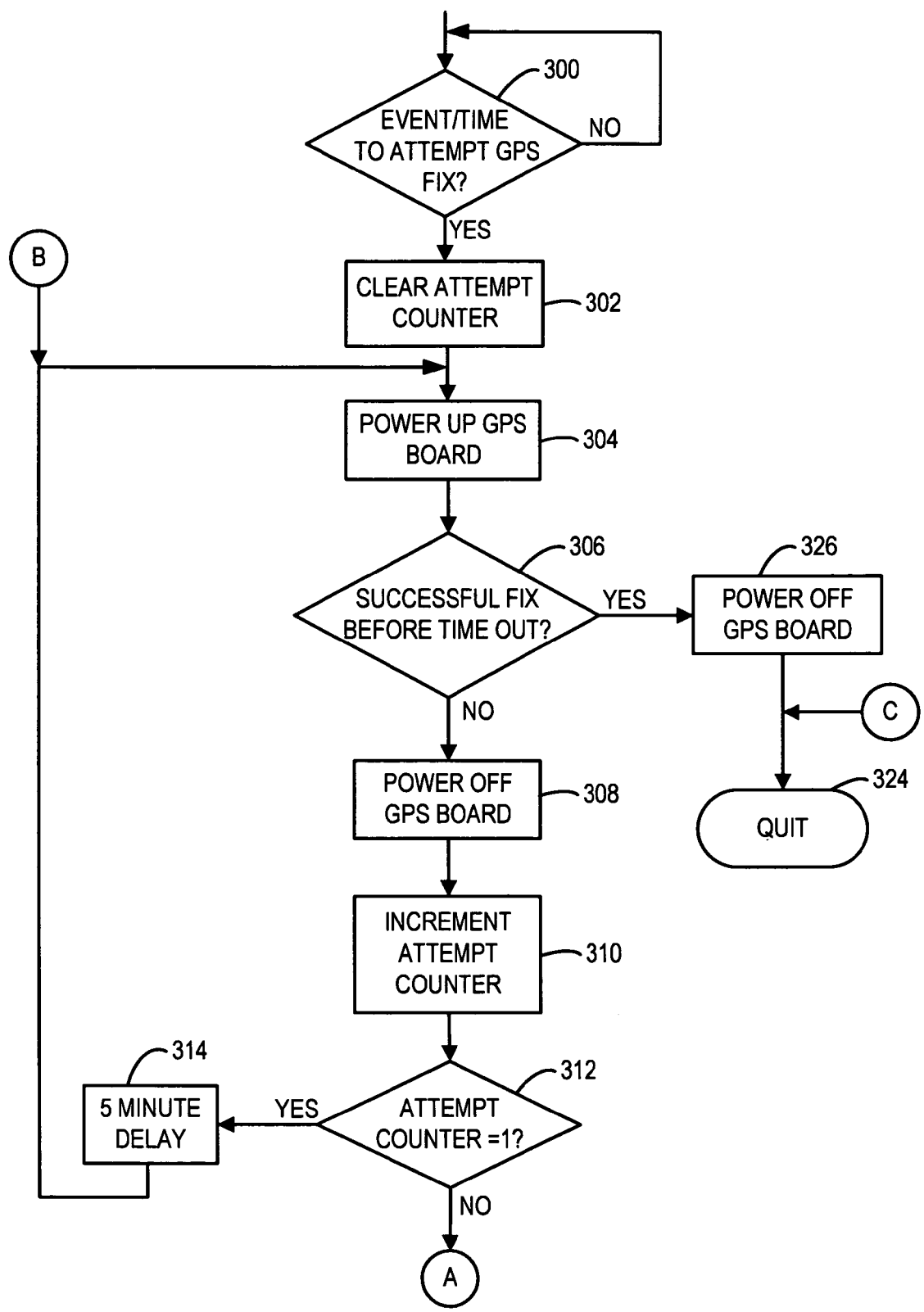
FIGS. 3A and 3B together form a flow chart that illustrates a process performed in the asset tracking unit of FIG. 2 according to some embodiments.
Figure 3B:
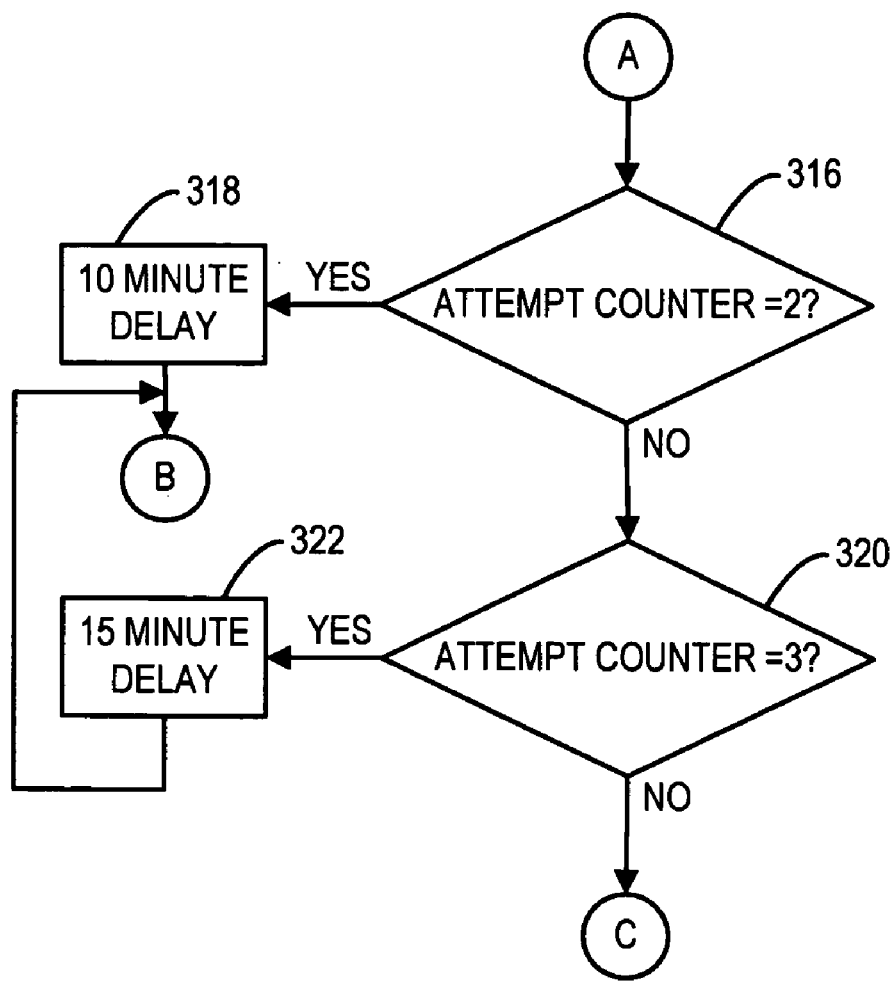

FIGS. 3A and 3B together form a flow chart that illustrates a process performed in the asset tracking unit 104 according to some embodiments of the invention. In general, the process of FIGS. 3A and 3B is concerned with controlling the operation of the GPS receiver 204 (FIG. 2), and more particularly controls the timing at which the GPS receiver attempts to acquire GPS satellite signals, including the timing at which such attempts are resumed after an unsuccessful attempt to acquire GPS satellite signals. The process of FIGS. 3A and 3B may, for example, be embodied in a software program that controls operation of the main controller 200.

Initially in FIG. 3A, a determination is made (as indicated at 300) as to whether a position fix using GPS satellite signals should be attempted at the current time. In some embodiments, a position fix attempt may be initiated at a predetermined time, such as once a day or a certain number of times a day at a particular time or times. In addition, or alternatively, a position fix attempt may be triggered by occurrence of an event (e.g., opening of a door of the transportation vehicle to which the asset tracking unit is attached, loading of cargo into the transportation vehicle, coupling of the transportation vehicle to a truck tractor, or uncoupling of the transportation vehicle from a truck tractor) that may be detected by a sensor and communicated by the sensor to the asset tracking unit. The process of FIGS. 3A and 3B may idle until one of the above-described predetermined occurrences takes place, whether the occurrence of a pre-set time of day, or an event detected by a sensor, or another occurrence which has been selected to result in the initiation of an attempt to acquire GPS satellite signals.

When a pre-determined occurrence occurs which is to result in an attempt to acquire GPS satellite signals, an attempt counter, described further below, may be cleared (i.e., reset to zero), as indicated at 302 in FIG. 3A. Then, as indicated at 304, the main controller 200 causes the GPS receiver 204 to be powered up, and the GPS receiver proceeds, in accordance with conventional practices for example, to attempt to acquire a sufficiently complete set of signals from the GPS satellites 102 to allow the GPS receiver to calculate a position fix for the asset tracking unit 104. Typically, signals from at least three or four satellites must be received by the GPS receiver to allow a fix to be obtained. In some instances, even if the GPS receiver is able to receive signals from four GPS satellites, the satellites may be positioned relative to each other in such a manner that unacceptable dilution of precision may result. In these cases the GPS receiver may need to receive signals from five or more GPS satellites.

Whether the necessary GPS satellite signals are available for the asset tracking unit to perform a position fix may depend on a number of circumstances, such as whether there are buildings or other structures, other vehicles, trees and/or local topographical features adjacent or nearby to the transportation vehicle to which the asset tracking unit is attached. In some embodiments, the GPS receiver may be allowed to operate for up to five minutes after power-up to attempt to acquire a set of GPS satellite that is adequate for determining a position fix for the asset tracking unit. In some embodiments, the maximum duration of the attempt period may be more or less than five minutes, and/or may be programmable based on input provided to the asset tracking unit by a user.

Based on a signal or data available from the GPS receiver 204, the main controller 200 determines (as indicated at 306 in FIG. 3A) whether the GPS receiver was able to determine a position fix before the period allowed for acquisition of GPS signals has expired. If not, then the main controller causes the supply of power to be removed from the GPS receiver at the end of the allowed period for GPS signal acquisition, as indicated at 308 in FIG. 3A. In addition, as indicated at 310, the main controller increments the attempt counter, which is a counter maintained by or in association with the main controller to keep track of the number of consecutive unsuccessful attempts to acquire a complete set of GPS signals.

It is next determined, as indicated at 312, whether the value of the attempt counter is equal to one. If so, after a first delay period (which may be five minutes in some embodiments, and is indicated at 314), the process loops back to 304, the GPS receiver is powered up again, and another attempt to acquire a complete set of GPS signals occurs.

In some embodiments, up to four unsuccessful GPS signal acquisition attempt periods may be performed after a trigger occurrence detected at 300. After each of the first three unsuccessful acquisition attempts, a delay period is interposed with the GPS receiver powered down to minimize battery drain. The delay periods are progressively increased in duration after each unsuccessful attempt to provide a favorable balance between likelihood of success in acquiring the GPS signals and demands upon the unit battery.

More specifically, in one embodiment, after the second unsuccessful attempt (attempt counter value found to be equal to two, as per 316 in FIG. 9B) a second delay period (indicated at 318) occurs that is longer than the first delay period, and then the process loops back again to 304 (FIG. 3A) for another GPS signal acquisition attempt. For example, in one embodiment the second delay period is ten minutes.

In one embodiment, after the third unsuccessful attempt (attempt counter value found to be equal to three, as per 320 in FIG. 3B) a third delay period (indicated at 322) occurs that is longer than the second delay period, and then the process again loops back to 304 (FIG. 3A) for still another GPS signal acquisition attempt. For example, in one embodiment the third delay period is 15 minutes.

In some embodiments, after a fourth unsuccessful GPS signal acquisition attempt, no further attempts are made (as indicated at 324 in FIG. 3A) and the GPS receiver remains powered off until the next triggering occurrence is detected or the next predetermined time for a position fix arrives, which may be a matter of hours or perhaps a day or more later.

All of the GPS signal acquisition attempt periods and the delay periods may be timed by the timing capability 202 of the main controller 200.

In other embodiments, the durations of the delay periods may be longer or shorter than those indicated in the drawing, but in accordance with principles of the present invention, the delay periods progressively increase after each successive unsuccessful GPS signal acquisition attempt after a triggering occurrence. In some embodiments, the durations of the delay periods, may, like the durations of the attempt periods, be programmable in response to user input.

In some embodiments, a maximum of three unsuccessful GPS signal acquisition attempts is made before "quitting". In other embodiments, five or more unsuccessful GPS signal acquisition attempts may be made before quitting. In some embodiments, the duration of the delay period may stop progressively increasing after a certain number of unsuccessful attempts.

Referring again to FIG. 3A, the process breaks out of the loop 304–310 upon successful acquisition of a complete set of GPS signals during the first or a subsequent GPS signal acquisition attempt period. The GPS receiver 204 provides to the main controller 200 data (e.g., latitude and longitude data, in a format established by the NMEA (National Marine Electronics Association)) indicative of the position fix determined by the GPS receiver 204 based on the received GPS signals, and the GPS receiver is powered down, as indicated at 326 in FIG. 3A, until after the next trigger occurrence is detected. The main controller may append the position fix data to a message and then may send the message (including a code which uniquely identifies the particular asset tracking unit) to the gateway via the VHF transceiver and modem 208, and via one or more of the communication satellites 110 (FIG. 1). The gateway then updates a database with fresh data concerning the location of the transportation vehicle to which the particular asset tracking unit has been assigned, and/or takes other suitable action in response to the message from the asset tracking unit.

The present invention has the technical effect of improving operation of, and reducing power consumption by, an asset tracking unit.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. An asset tracking unit, comprising:
a GPS (Global Positioning System) receiver configured to selectively receive GPS signals from GPS satellites; and
a controller coupled to the GPS receiver and programmed to:
activate the GPS receiver in response to a predetermined occurrence;
determine whether the GPS receiver has received within a first predetermined attempt period of time a set of GPS signals adequate to determine a location of the asset tracking unit;
if the controller determines that the GPS receiver did not receive the set of the GPS signals within the first predetermined attempt period of time, deactivate the GPS receiver for a first delay period of time;
activate the GPS receiver upon completion of the first delay period of time;
determine whether the GPS receiver has received within a second predetermined attempt period of time, immediately following the first delay period of time, a set of GPS signals adequate to determine the location of the asset tracking unit;
if the controller determines that the GPS receiver did not receive the set of GPS signals within the second predetermined attempt period of time, deactivate the GPS receiver for a second delay period of time that is longer than the first delay period of time; and
activate the GPS receiver upon completion of the second delay period of time.

2. The asset tracking unit of claim 1, wherein the controller is further programmed to:
- determine whether the GPS receiver has received within a third predetermined attempt period of time, immediately following the second delay period of time, a set of GPS signals to determine the location of the asset tracking unit;
- if the controller determines that the GPS receiver did not receive the set of GPS signals within the third predetermined attempt period of time, deactivate the GPS receiver for a third delay period of time that is longer than the second delay period of time; and
- activate the GPS receiver upon completion of the third delay period of time.

3. The asset tracking unit of claim 2, wherein the first delay period is five minutes, the second delay period is ten minutes and the third delay period is 15 minutes.

4. The asset tracking unit of claim 3, wherein each of the first, second and third predetermined attempt periods is five minutes.

5. The asset tracking unit of claim 1, wherein the controller is configured to allow programming based on user input of respective durations of the first, second and third determined attempt periods and of the first and second delay periods.

6. The asset tracking unit of claim 1, wherein the asset tracking unit times the first and second delay periods with a timing capability of the asset tracking unit.

7. The asset tracking unit of claim 1, further comprising:
- a housing that supports the GPS receiver and the controller; and
- means for securing the housing to a transportation vehicle.

8. The asset tracking unit of claim 1, further comprising:
- a message transmitter coupled to the controller and configured to transmit to a gateway a message indicative of a current location of the asset tracking unit.

9. The asset tracking unit of claim 1, wherein the predetermined occurrence is an event in which a trailer unit to which the asset tracking unit is secured is uncoupled from a tractor unit.

10. The asset tracking unit of claim 1, wherein the first and second delay periods have a combined duration of less than one hour.

11. A method of operating a GPS (Global Positioning System) receiver, the method comprising:
- activating the GPS receiver in response to a predetermined occurrence;
- determining whether the GPS receiver has received within a first predetermined attempt period of time a set of GPS signals adequate to determine a location of the GPS receiver;
- if a determination is made that the GPS receiver did not receive the set of the GPS signals within the first predetermined attempt period of time, deactivating the GPS receiver for a first delay period of time;
- activating the GPS receiver upon completion of the first delay period of time;
- determining whether the GPS receiver has received within a second predetermined attempt period of time, immediately following the first delay period of time, a set of GPS signals adequate to determine the location of the GPS receiver;
- if a determination is made that the GPS receiver did not receive the set of GPS signals within the second predetermined attempt period of time, deactivating the GPS receiver for a second delay period of time that is longer than the first delay period of time; and
- activating the GPS receiver upon completion of the second delay period of time.

12. The method of claim 11, further comprising:
- determining whether the GPS receiver has received within a third predetermined attempt period of time, immediately following the second delay period of time, a set of GPS signals to determine the location of the GPS receiver;
- if a determination is made that the GPS receiver did not receive the set of GPS signals within the third predetermined attempt period of time, deactivating the GPS receiver for a third delay period of time that is longer than the second delay period of time; and
- activating the GPS receiver upon completion of the third delay period of time.

13. The method of claim 12, wherein the first delay period is five minutes, the second delay period is ten minutes and the third delay period is 15 minutes.

14. The method of claim 13, wherein each of the first, second and third predetermined attempt periods is five minutes.

15. The method of claim 11, further comprising:
- transmitting to a gateway a message indicative of a current location of the GPS receiver.

16. The method of claim 11, wherein the first and second delay periods have a combined duration of less than one hour.

17. An asset tracking system, comprising:
- a gateway;
- a plurality of asset tracking units, each coupled to a respective transportation vehicle and including:
  - a GPS (Global Positioning System) receiver configured to selectively receive GPS signals from GPS satellites;
  - a transmitter; and
  - a controller coupled to the GPS receiver and to the transmitter and programmed to:
    - activate the GPS receiver in response to a predetermined occurrence;
    - determine whether the GPS receiver has received within a first predetermined attempt period of time a set of GPS signals adequate to determine a location of the asset tracking unit;
    - if the controller determines that the GPS receiver did not receive the set of the GPS signals within the first predetermined attempt period of time, deactivate the GPS receiver for a first delay period of time;
    - activate the GPS receiver upon completion of the first delay period of time;
    - determine whether the GPS receiver has received within a second predetermined attempt period of time, immediately following the first delay period of time, a set of GPS signals adequate to determine the location of the asset tracking unit;
    - if the controller determines that the GPS receiver did not receive the set of GPS signals within the second predetermined attempt period of time, deactivate the GPS receiver for a second delay period of time that is longer than the first delay period of time;
    - activate the GPS receiver upon completion of the second delay period of time; and
    - if the controller determines that the GPS receiver received the set of GPS signals, control the transmitter so that the transmitter transmits to the gateway a message that indicates a current location of the respective asset tracking unit.

18. The asset tracking system of claim 17, wherein the respective controller of each asset tracking unit is further programmed to:

determine whether the GPS receiver has received within a third predetermined attempt period of time, immediately following the second delay period of time, a set of GPS signals to determine the location of the asset tracking unit;

if the controller determines that the GPS receiver did not receive the set of GPS signals within the third predetermined attempt period of time, deactivate the GPS receiver for a third delay period of time that is longer than the second delay period of time; and activate the GPS receiver upon completion of the third delay period of time.

19. The asset tracking system of claim 18, wherein the first delay period is five minutes, the second delay period is ten minutes and the third delay period is 15 minutes.

* * * * *